US011207960B2

(12) United States Patent
Vetsch

(10) Patent No.: US 11,207,960 B2
(45) Date of Patent: Dec. 28, 2021

(54) SELF-DEPLOYING AND SELF-RETRACTING AUTOMOBILE COVER

(71) Applicant: Ethan Vetsch, Spokane, WA (US)

(72) Inventor: Ethan Vetsch, Spokane, WA (US)

(*) Notice: Subject to any disclaimer, the term of this patent is extended or adjusted under 35 U.S.C. 154(b) by 0 days.

(21) Appl. No.: 16/268,492

(22) Filed: Feb. 5, 2019

(65) Prior Publication Data

US 2020/0247222 A1  Aug. 6, 2020

(51) Int. Cl.
*B60J 11/04* (2006.01)
*H02S 99/00* (2014.01)

(52) U.S. Cl.
CPC .............. *B60J 11/04* (2013.01); *H02S 99/00* (2013.01)

(58) Field of Classification Search
CPC .............. B60J 11/00; B60J 11/02; B60J 11/04
USPC .............................. 296/136.01, 136.1, 136.12
See application file for complete search history.

(56) References Cited

U.S. PATENT DOCUMENTS

| 5,795,012 A * | 8/1998 | Liou | B60J 11/00 135/16 |
| 6,935,674 B1 * | 8/2005 | Campos | B60J 11/00 296/136.1 |
| 7,562,928 B1 * | 7/2009 | Morazan | B60J 11/00 296/136.01 |
| 8,651,555 B2 * | 2/2014 | Chan | B60J 11/04 150/166 |
| 9,783,033 B2 * | 10/2017 | Wang | B60R 9/00 |
| 9,815,359 B2 * | 11/2017 | Morazan | B60J 11/04 |
| 10,239,400 B2 * | 3/2019 | Merryman | B60J 11/04 |
| 10,501,958 B2 * | 12/2019 | Veracini | E04H 15/06 |

* cited by examiner

*Primary Examiner* — Jason S Daniels

(74) *Attorney, Agent, or Firm* — Kimberly McLean; McLean Law LLC

(57) ABSTRACT

A self-deploying and self-retracting automobile cover system. The system including an actuator mechanism, a housing unit and a cover. The actuator mechanism controls the operation of the cover, wherein the actuator mechanism triggers the automatic deployment of the cover such that the cover expands outward from the housing unit and triggers the automatic retraction of the cover such that the cover collapses into the housing unit. Upon deployment, the deployed cover is configurable to operate as a touchless cover such that each shield member of the pair of coverlets is void of any physical contact with the automobile or is configurable to operate as a touch cover such that each shield member of the pair of coverlets is in physical contact with the automobile.

15 Claims, 6 Drawing Sheets

SELF-DEPLOYING AND SELF-RETRACTING AUTOMOBILE COVER

FIELD OF THE INVENTION

Embodiments described herein generally relate to automobile covers, and more particularly to a self-deploying and self-retracting automobile cover.

BACKGROUND OF THE INVENTION

Hot summer days can make getting back into one's car after a long day a hot and uncomfortable experience. It is also likely that, when left out in environment elements, an automobile's appearance can seem dull with signs of wear. Using an automobile cover to create shade for the automobile and protect the automobile from weather conditions, environmental elements and sun damage is desirable to increase the viability of the automobile and to preserve the physical appearance of the automobile.

BRIEF DESCRIPTION OF THE DRAWINGS

The various advantages of the embodiments of the present disclosure will become apparent to one skilled in the art by reading the following specification and appended claims, and by referencing the following drawings, in which:

SUMMARY OF THE INVENTION

Figure 1:
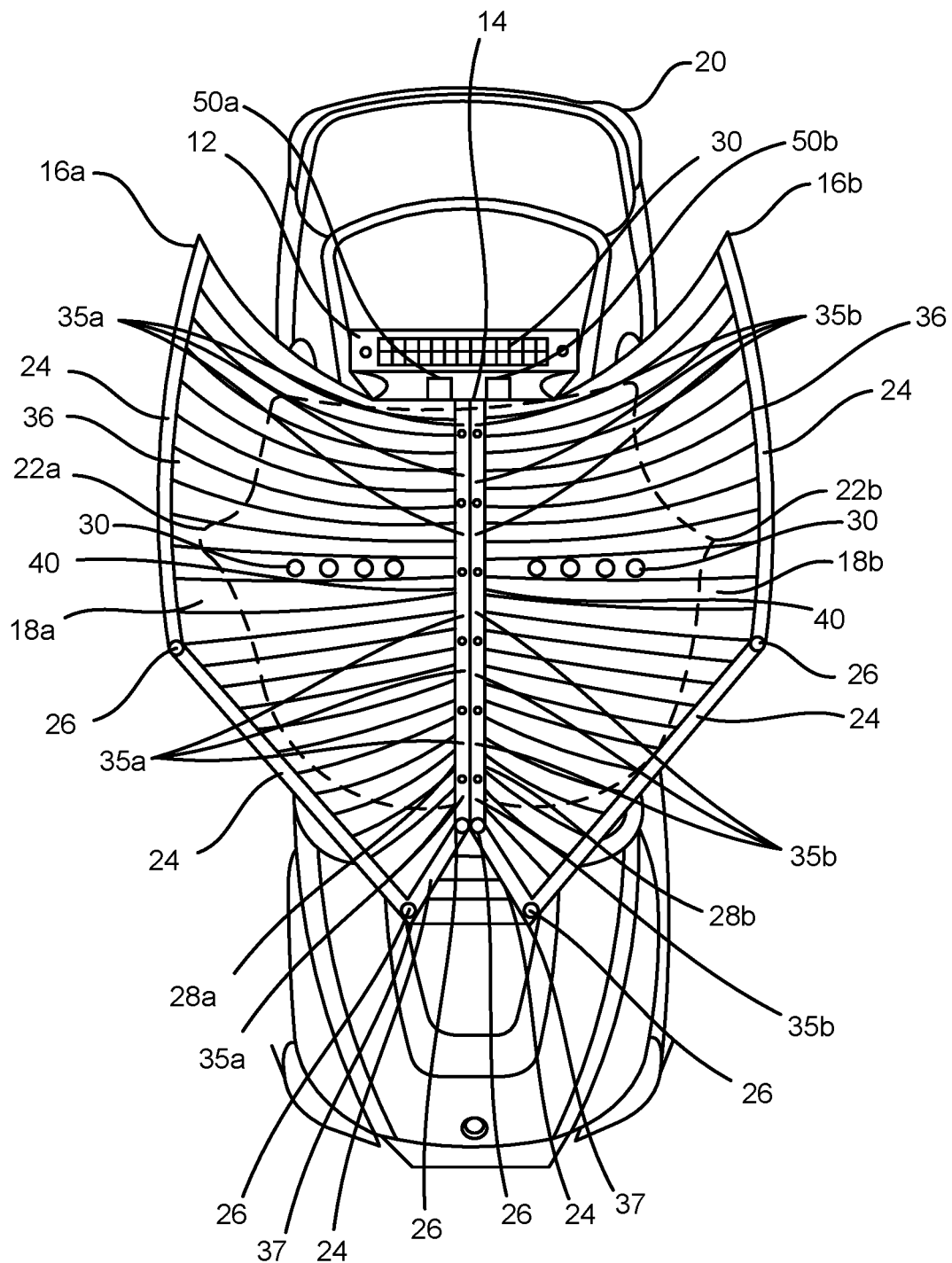
FIG. 1 shows an exemplary view of a self-deploying and self-retracting automobile cover with the automobile cover shown in a deployed position according to an embodiment of the present disclosure.

Exemplary embodiments disclosed herein describe a self-deploying and self-retracting automobile cover system. The system includes an actuator mechanism, a housing unit and a cover. The actuator mechanism controls the operation of the cover, wherein the actuator mechanism triggers the automatic deployment of the cover such that the cover expands outward from the housing unit and triggers the automatic retraction of the cover such that the cover collapses into the housing unit. The housing unit includes a mounting element for mounting the cover to the housing unit and it includes an enclosure for storing the cover in a retracted position. The cover contains a pair of coverlets, each coverlet includes a shield member and a frame. The shield member is encompassed within the frame and includes a plurality of sectioned regions. The frame has a collapsible structure and includes a plurality of arm frame members, a plurality of joints, and a spinal frame member. The plurality of arm frame members are each connected to the shield member along a distal peripheral edge and bottom region of the shield member and the plurality of joints are each used to connect adjoining arm frame members. The spinal frame member includes a plurality of collapsible sections which are interconnected by joints. The spinal frame member is connected to the shield member along a proximate edge of the shield member and is fixedly attached at its topmost region to the mounting element in the housing unit. Upon deployment, the deployed cover is configurable to operate as a touchless cover such that each shield member of the pair of coverlets is void of any physical contact with the automobile or is configurable to operate as a touch cover such that each shield member of the pair of coverlets is in physical contact with the automobile.

In some exemplary embodiments, the orientation of the deployed cover is adjustable when the cover is configurable to operate as a touchless cover.

In some exemplary embodiments, the orientation of the deployed cover configurable as a touchless cover is adjustable such that each coverlet may be positioned either horizontally such that the cover is extended in parallel to and above the top region of the automobile or each coverlet may be positioned vertically such that the cover is extended in parallel to and along each side of the automobile.

In some exemplary embodiments, the system comprises a plurality of solar panels attached to a top surface of the housing unit.

In some exemplary embodiments, one or more of the plurality of sectioned regions of each shield member includes a solar panel attached thereto.

In some exemplary embodiments, the housing unit includes an onboard battery.

In some exemplary embodiments, the housing unit includes an onboard compressor.

In some exemplary embodiments, the housing unit is fixedly attached to a roof region of the automobile.

In some exemplary embodiments, the mounting element includes a pair of rotating sockets which are located at a front center region of the housing unit.

In some exemplary embodiments, each spinal frame member for each coverlet is mounted to a corresponding rotating socket.

In some exemplary embodiments, the actuator mechanism is a push button mechanism.

In some exemplary embodiments, the onboard compressor causes the cover to self-deploy upon activation of the push button.

In some exemplary embodiments, the onboard compressor causes the cover to self-retract upon deactivation of the push button.

In some exemplary embodiments, each shield member includes carbon fiber materials.

In some exemplary embodiments, upon deployment of the cover, the shield member of each coverlet unfolds to an origami canvas made up of the plurality of sectioned regions into the shape of a wing.

In some exemplary embodiments, each arm frame member and spinal frame member include a carbon fiber hollow tube.

DETAILED DESCRIPTION

Figure 3A:
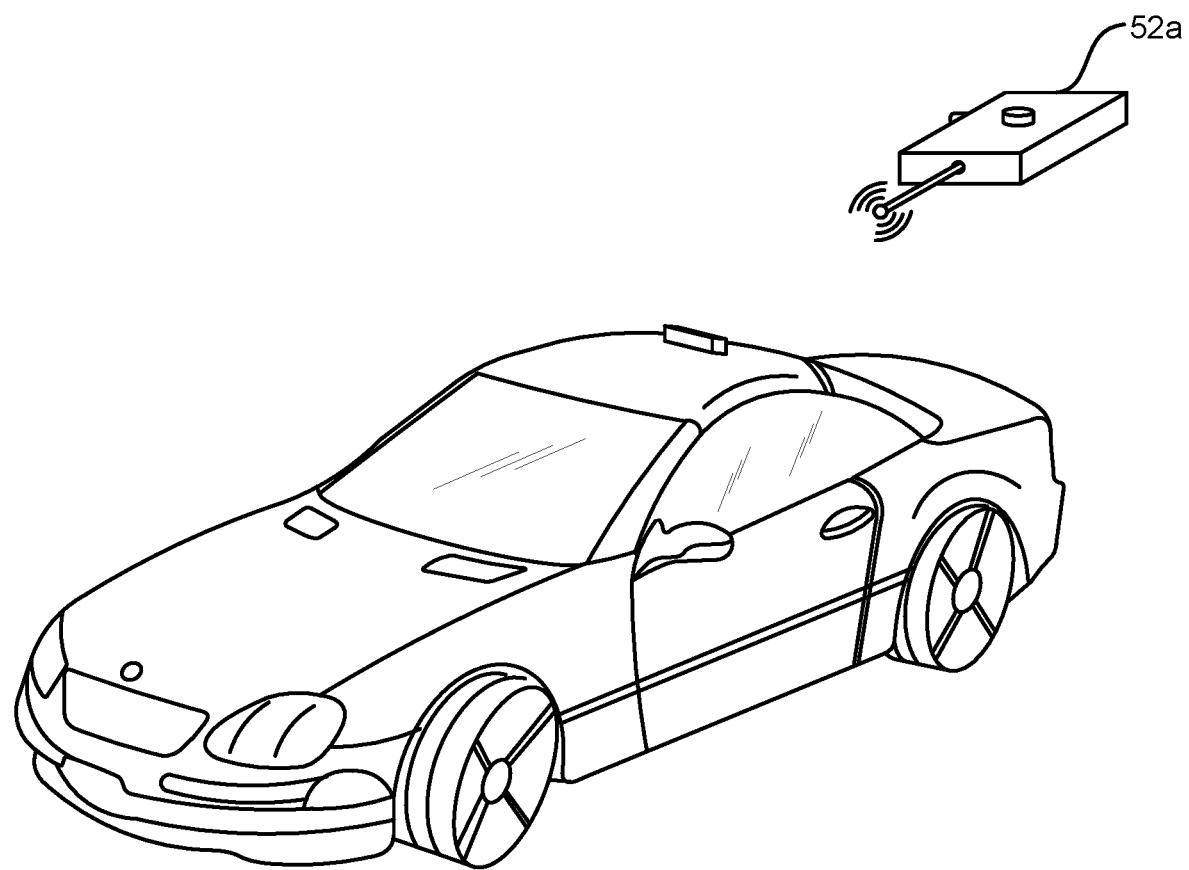
FIG. 3A shows an exemplary view of an actuator mechanism for deploying and retracting the self-deploying and self-retracting automobile cover according to an embodiment of the present disclosure.
Figure 3B:
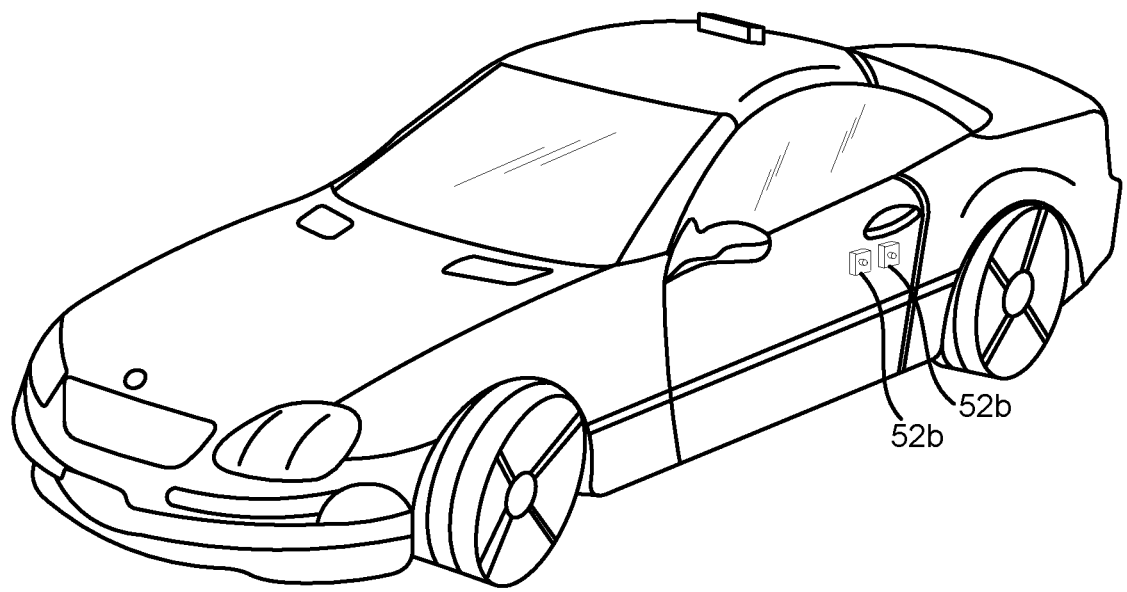
FIG. 3B shows another exemplary view of an actuator mechanism for deploying and retracting the self-deploying and self-retracting automobile cover according to an embodiment of the present disclosure.

The present disclosure relates to a self-deployable and self-retractable automobile cover system ("the system"). As illustrated in FIG. 1, the system includes an actuator mechanism 52 (shown in FIGS. 3A and 3B), a housing unit 12, and a cover 14. The actuator mechanism controls the operation of the cover. The actuator mechanism triggers the automatic deployment of the cover, where the cover expands outward from the housing unit. Moreover, the actuator mechanism triggers the automatic retraction of the cover, where the cover collapses into the housing unit The actuator mechanism 52 may be any suitable mechanism for deploying and retracting a foldable or collapsible device. In a preferred embodiment, the actuator mechanism is a push button mechanism. The actuator mechanism may be located on the automobile 20 (FIG. 3B, 52b). In an alternative embodiment, the actuator mechanism may be located on a remote control (FIG. 3A, 52a).

The housing unit 12 is a rigid casing that encloses a plurality of elements and is fixedly attached to a roof region of an automobile 20. The housing unit includes an enclosure that stores the retracted cover and a mounting element for mounting the cover 14 to the housing unit. The mounting element may be any suitable hardware mechanism for attaching the cover to the housing unit. In a preferred embodiment, the mounting element includes a pair of rotating sockets 50a, 50b, which are located at a front center region of the housing unit, for attaching the cover to the housing unit. The enclosure also stores one or more batteries, a compressor, a power inverter, a communication device and a weather data collection device. The batteries may be any suitable batteries. In a preferred embodiment, the batteries are solid state lithium ion batteries.

The actuator mechanism 52 may be attached to the roof region of an automobile 20 on an opposite side of the roof from where the housing unit is connected. The actuator mechanism 52 may be connected directly to the compressor in the housing unit so that the actuator mechanism can trigger the compressor to retract the cover or to deploy the cover. A push button actuator mechanism may switch the compressor between a suction mode, where the compressor suctions the cover 14 causing the cover to self-retract (i.e., collapse) into the housing unit or a non-suction mode, where the compressor blows out the cover causing the cover to self-deploy (i.e., expand) the cover from the housing unit.

The housing unit 12 includes a plurality of solar panels 30 attached to a top region of the housing unit. The solar panels harness the power of the sun and store the power by charging the one or more batteries for personal use, such as, for example, to charge an electric vehicle. Alternatively, the automobile 20 may return the power to the power grid. The power from the solar panels is used to power the components enclosed in the housing unit.

The cover 14 consists of a pair of coverlets 16a and 16b. Each coverlet includes a shield member 18, and a frame (includes References 24, 26 and 28). As illustrated in FIG. 1, each shield member is encompassed within a corresponding frame. Each shield member includes a plurality of sectioned regions 22a and 22b. One or more of the plurality of sectioned regions 22a, 22b may include solar panels 30 attached thereto.

In addition, the sectioned regions 22a and 22b within each shield member form an origami canvas within each coverlet. When the cover is deployed, the shield member of each coverlet unfolds to the origami canvas made up of the plurality of sectioned regions into the shape of a wing. In a preferred embodiment, the origami canvases are each shaped like a wing. However, the origami canvases may be any suitable shape and size. Each shield member may be made of any suitable materials. In a preferred embodiment, the shield members are made of carbon fiber materials.

Each frame has a collapsible structure including a plurality of arm frame members 24, a plurality of joints 26 and a spinal frame member 28a and 28b. The plurality of arm frame members are each connected to a corresponding shield member 18a and 18b along a distal peripheral edge 36 and bottom region 37 of the shield member. The plurality of joints are each used to connect adjoining arm frame members. Each spinal frame member 28a and 28b includes a plurality of collapsible sections 35a and 35b which are interconnected by joints 26. Each spinal frame member is connected to a corresponding shield member 18a and 18b along a proximate edge 40 of the shield member. The spinal frame members for each coverlet is fixedly attached at its topmost region to the mounting element in the housing unit. In a preferred embodiment, each spinal frame member is mounted to a corresponding rotating socket 50a, 50b in the housing unit.

The arm frame members 24 and spinal frame members 28 may be made out of any suitable semi-rigid material. In a preferred embodiment, the frame members 24 and 28 are made out of carbon fiber hollow tubing. The joints 26 may be any suitable mechanical joints, such as, for example, bolted joint or a screw joint.

Figure 2A:
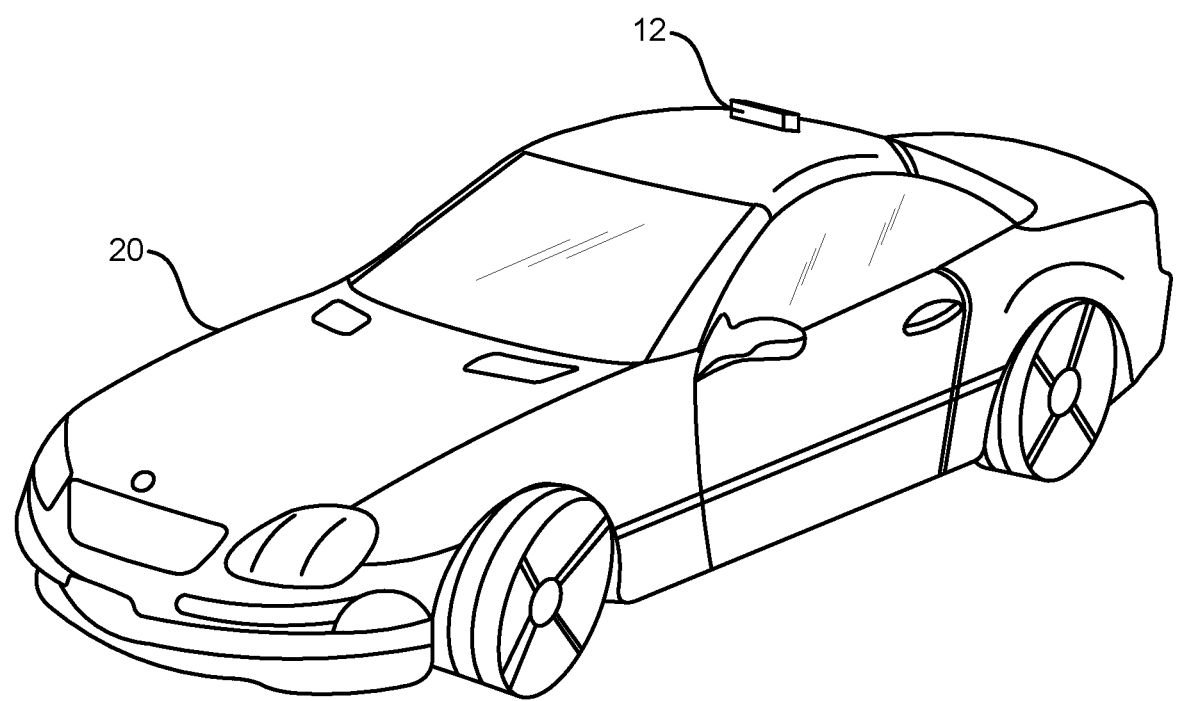
FIGS. 2A-2C show exemplary views of a self-deploying and self-retracting automobile cover with the automobile cover shown in both retracted and deployed positions according to an embodiment of the present disclosure.
Figure 2B:
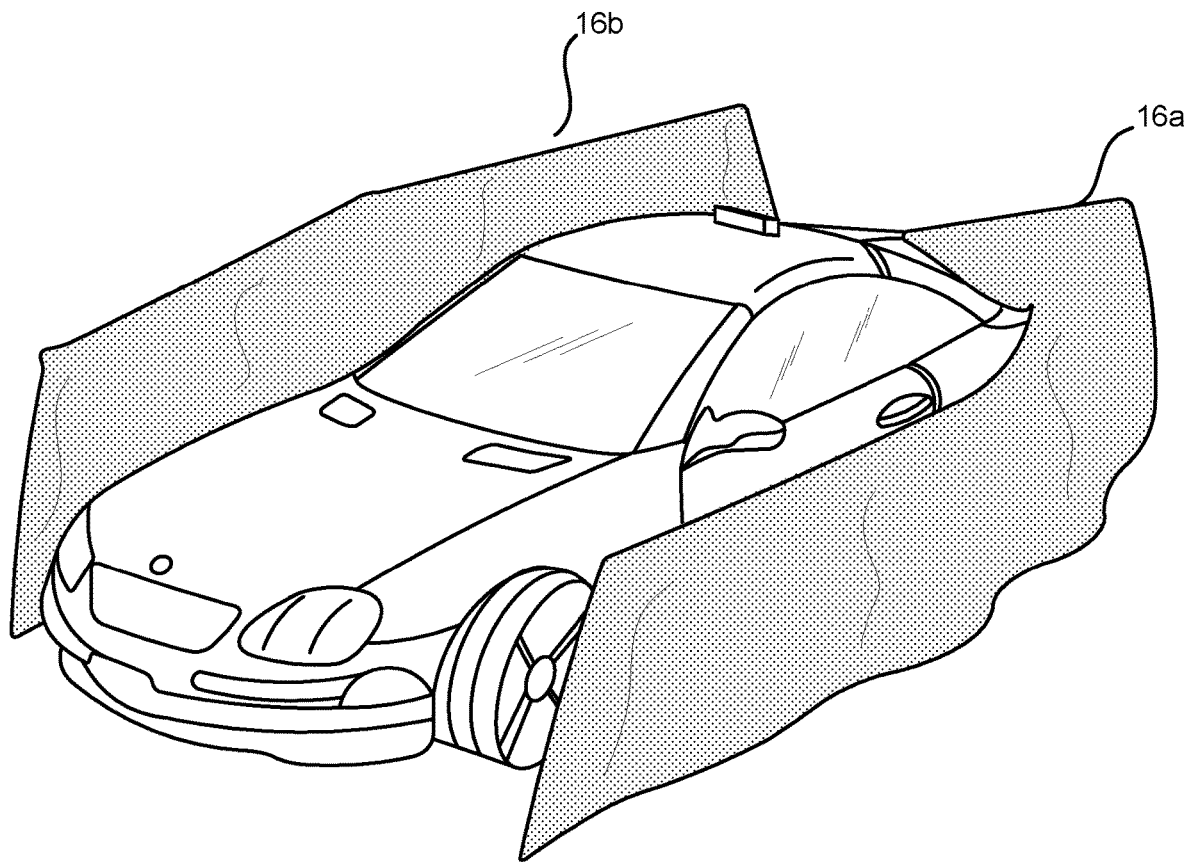
Figure 2C:
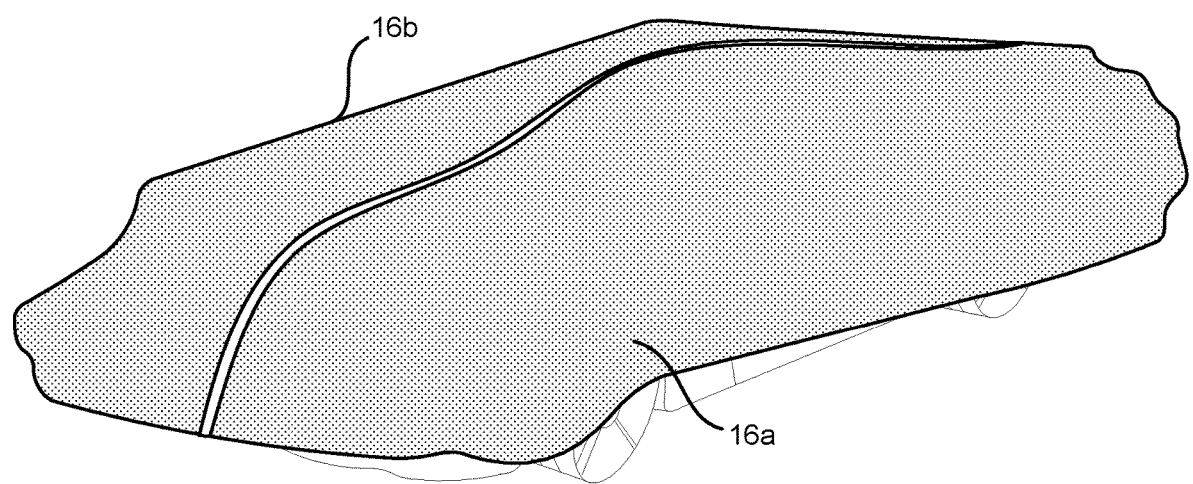

The cover 14 originates in a retracted position in the housing unit 12 as illustrated in FIG. 2A. When the cover 14 is deployed from the housing unit 12, the deployed cover may be configured to operate as a touchless cover, as illustrated in FIGS. 1 and 2B, where each shield member of the pair of coverlets is void of any physical contact with the automobile. Alternatively, the deployed cover may be configured to operate as a touch cover, as illustrated in FIG. 2C, where each shield member of the pair of coverlets is in physical contact with the automobile.

In the touchless mode of operation, the orientation of the deployed cover is adjustable. An individual may manually move each coverlet to a desired position. The coverlets may be positioned horizontally side by side, as illustrated in FIG. 1, such that the cover 14 is extended in parallel to and above the top region of the automobile 20. Alternatively, the coverlets may be positioned vertically from one another, as illustrated in FIG. 2B, such that the cover 14 is extended in parallel to and along each side of the automobile.

In another exemplary embodiment, the cover includes small wind turbines for creating additional electricity.

In another exemplary embodiment, the system includes one or more trackers to track the sun and move the coverlets embedded with solar panels to an optimal position for the greatest generation of power.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A self-deploying and self-retracting automobile cover system comprising:
    an actuator mechanism for controlling the operation of the cover, wherein the actuator mechanism operates to trigger automatic deployment of the cover such that the cover expands outward from a housing unit or to trigger automatic retraction of the cover such that the cover collapses into the housing unit;
    the housing unit including a mounting element for mounting the cover to the housing unit and including an enclosure for storing the cover in a retracted position; and
    a cover having a pair of coverlets, each coverlet including a shield member and a frame, the shield member is encompassed within the frame and includes a plurality of sectioned regions, the frame having a collapsible structure including a plurality of arm frame members, a plurality of joints, and a spinal frame member, the plurality of arm frame members are each connected to the shield member along a distal peripheral edge and bottom region of the shield member, the plurality of joints are each used to connect adjoining arm frame members, the spinal frame member includes a plurality of collapsible sections which are interconnected by joints, the spinal frame member is connected to the shield member along a proximate edge of the shield member and is fixedly attached at its topmost region to the mounting element in the housing unit, and wherein, upon deployment, the deployed cover is configurable to operate as a touchless cover such that each shield member of the pair of coverlets is void of any physical contact with the automobile or is configurable to operate as a touch cover such that each shield member of the pair of coverlets is in physical contact with the automobile.

2. The system of claim 1, wherein an orientation of the deployed cover is adjustable when the cover is configurable to operate as the touchless cover.

3. The system of claim 1, further comprising a plurality of solar panels attached to a top surface of the housing unit.

4. The system of claim 1, wherein one or more of the plurality of sectioned regions of each shield member includes a solar panel attached thereto.

5. The system of claim 1, wherein the housing unit includes an onboard battery.

6. The system of claim 1, wherein the housing unit includes an onboard compressor.

7. The system of claim 6, wherein the actuator mechanism is a push button mechanism.

8. The system of claim 7, wherein the onboard compressor causes the cover to self-deploy upon activation of the push button.

9. The system of claim 7, wherein the onboard compressor causes the cover to self-retract upon deactivation of the push button.

10. The system of claim 1, wherein the housing unit is fixedly attached to a roof region of the automobile.

11. The system of claim 1, wherein the mounting element includes a pair of rotating sockets which are located at a front center region of the housing unit.

12. The system of claim 11, wherein each spinal frame member for each coverlet is mounted to a corresponding rotating socket.

13. The system of claim 1, wherein each shield member includes carbon fiber materials.

14. The system of claim 1, wherein, upon deployment of the cover, the shield member of each coverlet unfolds to an origami canvas made up of the plurality of sectioned regions into the shape of a wing.

15. The system of claim 1, wherein each arm frame member and spinal frame member include a carbon fiber hollow tube.

* * * * *